United States Patent Office 3,127,512
Patented Mar. 31, 1964

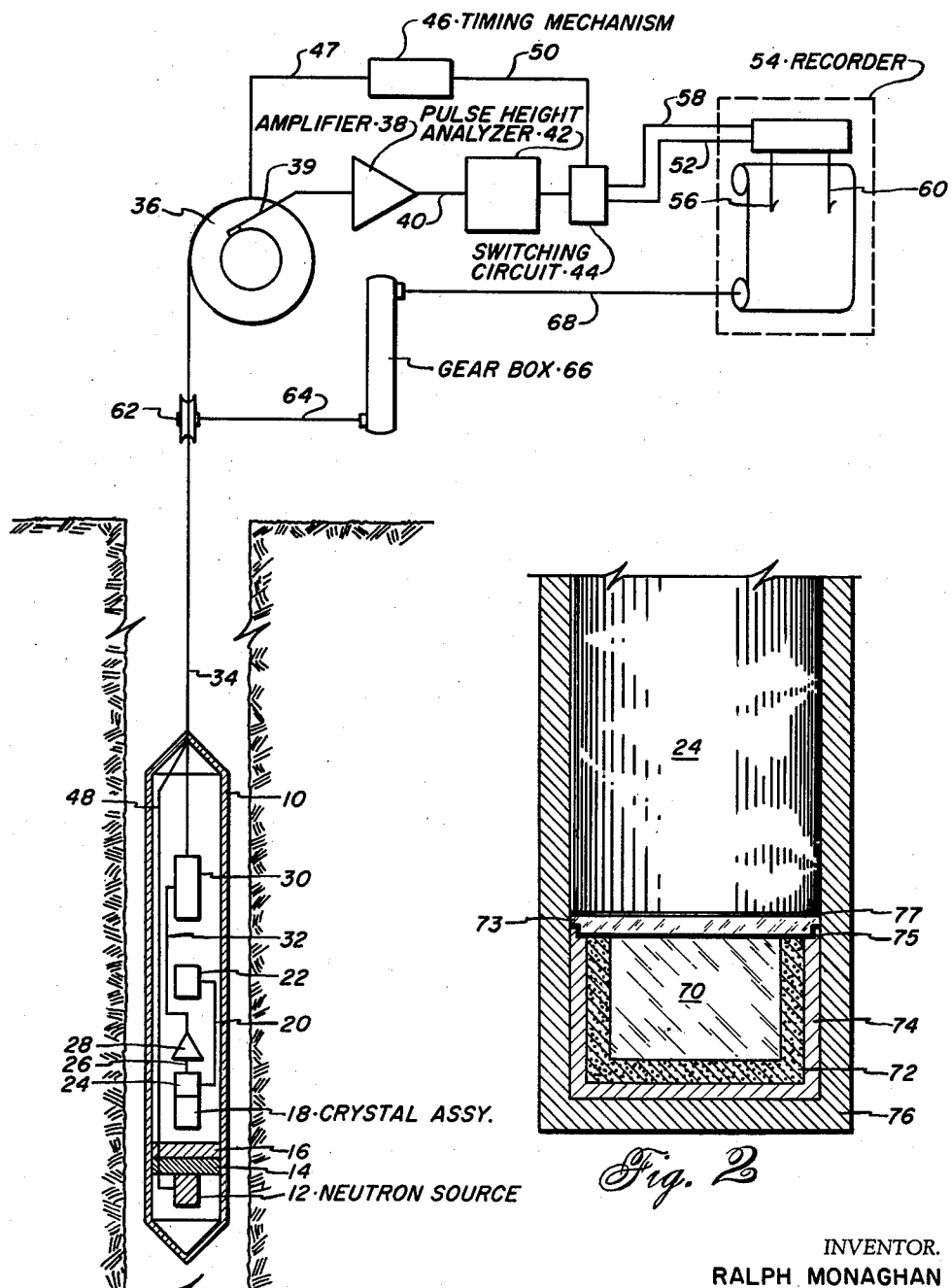

3,127,512
NEUTRON-GAMMA GEOPHYSICAL PROSPECT-
ING METHOD AND APPARATUS
Ralph Monaghan, Tulsa, Okla., assignor to Well Surveys
Inc., a corporation of Delaware
Filed June 30, 1958, Ser. No. 745,741
3 Claims. (Cl. 250—71.5)

This invention pertains to the art of subsurface prospecting for oil and other valuable materials. More particularly, the invention is concerned with improvements in radioactivity well logging, especially improvements in the art of what is known as neutron-gamma ray logging and activation logging.

Neutron-gamma ray logging is a well-known method of subsurface prospecting whereby logs, or curves, correlated with depth in the well bore are prepared to provide an indication of the nature of the subsurface strata throughout the depth of the well bore. The preparation of these logs involves traversing of the well bore with a source of neutrons and a radiation-responsive generator of impulses, the latter being referred to as a detector. These instruments are mounted in a suitable housing, together with other electrical apparatus adapted to provide an electrical signal, representative of radiations from the formations surrounding the well bore, suitable for use in preparing the logs. The housing is attached to a cable which serves to effect lowering and raising of the housing in the well bore and also to carry the electrical signals to instrumentation maintained above ground. As the housing is moved through the bore hole, the strata are bombarded by the neutron flux provided by the neutron source and the detector serves to detect gamma radiation arising in the formation as a result of the neutron bombardment whereby the electrical impulses or signals are produced from which the neutron-gamma ray logs are made. Thus, logs which are made according to this method are measurements of gamma ray energy which, for the most part, is due to neutron capture by the rocks of the formation and the simultaneous release of discrete energy quanta in the form of gamma radiation. This is an instantaneous form of energy release in the sense that it has no measurable half life.

In addition to the neutron-mineral interactions leading to the production of instantaneous gamma radiation as described in the foregoing paragraph, in the course of bombarding the formation, other neutron interactions take place with the rocks and fluids of the formation leading to the production of radioactive isotopes which are unstable and which decay with their characteristic half lives. According to another form of well logging, which is known as activation well logging, the decay energy of these unstable isotopes is detected and recorded as a curve indicative of particular characteristics of the formation. Inasmuch as, in most instances, the half lives of the isotopes which are produced are relatively short, activation logs must necessarily be prepared substantially immediately upon the occurrence of neutron bombardment since otherwise the formation activation rapidly becomes so weak as not to be readily detectable and measurable. Accordingly, activation logging is often carried out simultaneously with the making of, for example, a neutron-gamma ray log. This is accomplished by providing within the housing a neutron source which may be turned on and off, commonly referred to as a pulsed source. The source may be turned on and off many times a second or on and off intermittently, for example, every few seconds, depending upon the type of study which is desired to be carried out.

During the time in which the neutron source is bombarding the formation, instantaneous gamma radiation is detected to provide the foregoing described neutron-gamma ray log, while during the time periods following the end of this irradiation, radioactive decay radiations from the unstable isotopes of formation are detected to provide a measurement of induced radioactivity, i.e., to provide the above-mentioned activation log. A single detector of radiations can be employed in making both of these measurements though not necessarily so; however, means are provided for separately recording the respective logs. For example, separate circuitry and aboveground logging equipment may be provided for each of the two types of logs, the output signal of the detector being arranged to be delivered to the respective circuits in time coincidence with the switching on and off of the neutron source. Thus, when the neutron source is off, the output signal of the detector is delivered to the circuitry leading to the production of an activation well log whereas when the source is on, the output signal of the detector is being delivered to the circuitry provided for the neutron-gamma ray log. Alternatively, the same circuitry may be employed for each log up to the point of recording, suitable switching circuitry being inserted just ahead of the recorder whereby to deliver the signal output to the proper recording facility. This, of course, is accomplished in time relation to the pulsing of the neutron source.

In the making simultaneously of the neutron-gamma ray log and the activation log, it, of course, is necessary to employ a neutron source which may be turned on and off to provide the pulsed or intermittently active source. Such sources are well known and may be of the type referred to as accelerated particle-type sources. Examples of these are the deuterium-deuterium source and the deuterium-tritium source wherein deuterium and tritium respectively are targets for high speed deuterium particles which have been accelerated by an electric field. Where the neutron-gamma ray log is the only log being prepared, it may be prepared from either the accelerated particle-type source or a conventional capsuled source, which latter source affords a continuous flux of neutrons and cannot be turned on or off. Examples of these latter are such well-known sources as provided by the radium-beryllium reaction, the actinium-beryllium reaction, and the polonium-beryllium reaction. Capsuled sources may be adapted for use in the production of simultaneous neutron-gamma ray logs and activation logs by providing the source of the type disclosed in Patent No. 2,303,688 to Robert E. Fearon. All of these various types of neutron sources are well known to those skilled in the art and they form no part of the present invention; accordingly, nothing more needs to be said about them for an understanding of the present invention.

It is now common practice to employ as the detecting medium, in various types of logging operations, particularly in the detection of gamma radiation, devices known as scintillation counters. Once again, these are well-known instruments, taking many forms. They are employed because of their high efficiency in the detection operation and they require little description here. A well-known, widely used and exemplary form of this type of detector is provided by the sodium iodide (thallium activated) crystal. Other suitable crystals are such as cesium iodide and potassium iodide, however, since so dium iodide is regarded as the best of this type of detector, in describing the present invention, reference will be made only to the thallium-activated sodium iodide form. Of course, it is to be understood that the invention is not restricted to the use of any particular scintillation crystal and especially not to sodium iodide.

Heretofore, in neutron-gamma ray well logging wherein scintillation counters have been employed, electronic components of the signal handling circuitry have been set at a threshold voltage sufficiently high to reject low-energy pulses, for example, below about 2 mev. Such low-energy pulses arise because of a multiplicity of effects occurring as a result of neutron interactions and they have become known as "background" pulses. Such pulses as recorded in the curve which are prepared in accordance with the logging operation are completely unintelligible although it has long been realized that contained within them are pulses which are significant of characteristics of the formation and which would be valuable to log were it possible to sort them from the aggregate signal.

In the course of preparing the activation log, the output signal from the detector arises as a result of low-energy pulses, at least in considerable measure, and, accordingly, the activation log has been suspected of inaccuracies and misleading information due to the same background effects mentioned in connection with the preparation of neutron-gamma ray logs. In fact, it has now been shown that the activation logs heretofore prepared have contained serious inaccuracies which, if not detected, lead to costly wasteful activities.

Because of the astonishing diversity of phenomena presented by the interaction of neutrons within the bore hole, it is not difficult to understand why the conditions leading to the foregoing mentioned disadvantages and difficulties have not heretofore been overcome notwithstanding the fact that highly skilled experts in nuclear phenomena have long been active in the field of interest herein, and have been concerned with these problems along with many others. However, it has now been discovered according to this invention that the foregoing disadvantages in neutron-gamma ray logging and the disadvantages and the inaccuracies occurring in the course of activation logging may be overcome quite readily and easily.

Generally stated, according to this invention, it has been discovered that by preventing the scintillation counter from being acted upon by scattered slow neutrons, the difficulties and disadvantages herein mentioned are overcome, and that this may be accomplished by a suitable shielding of the scintillation counter. The discovery of the remedial step according to this invention leads one to a very definite conclusion as to the cause of the herein mentioned undesired effects, which causes are of interest in connection with an understanding of the invention, and, therefore, are described presently hereinafter.

It has long been known that much of the neutron flux incident upon the subsurface formation in the course of the making of neutron-gamma ray logs is returned to the well bore in the form of scattered neutrons, the intensity of which varies according to the character of the formations encountered by the neutron flux. The flux of scattered neutrons is composed of neutrons of various energy levels; however, for the very great major portion of the flux, it may be said that the composition is of low-energy neutrons, that is to say, neutrons from a little above thermal energy up to about one mev. According to this invention, it has been discovered that these scattered neutrons are the cause of the difficulties and disadvantages encountered in the preparation of the logs mentioned herein. More particularly, it has been found according to this invention that as a result of the effects of scattered neutrons upon the scintillation detector, the detector itself becomes radioactive, and its decay products, which result in photon energy, constitutes the bulk of the low-energy background impulses delivered to the circuitry for inclusion in the recorded curve. For example, where a sodium iodide (thallium activated) crystal is employed, isotopes of all three component elements are formed. Iodine-127 becomes by way of neutron capture iodine-128 which decays by beta decay to xenon-128. Inasmuch as iodine-128 has a half life of 25 minutes, the crystal is active over a considerable length of time. Slow neutrons are also captured by sodium and thallium in a similar manner and, although the cross sections for these latter reactions are substantially less than for iodine, they are not negligible; therefore, decay products from the isotopes so formed enter into and become a part of the overall background energy release from the crystal.

It will be appreciated that the background radiation arising from the decay of isotopes produced within the detector will vary according to the experiences of the detector with respect to slow neutrons as it progresses through the well. Thus, there may be periods when the intensity of energy released by the crystal due to radioactive decay will be less than at other times; however, it is apparent that the effects of slow neutrons produce a substantially continuous undesirable condition.

According to this invention, and as mentioned herein above, it has been discovered that the described condition within the detector is overcome when it is provided with a suitable interceptor of scattered neutrons.

Thus, it may be stated that an object of this invention is to provide means and methods for the preparation of a neutron-gamma ray log wherein gamma radiation arising in the formations may be detected by a detector without substantial interference from scattered neutrons leading to radioactivity within the detector itself, whereby output pulses of the scintillation detector may be employed to provide a log which is intelligible throughout a wider range of pulse energy levels.

A further object of the invention may be stated to be the provision of means and methods of making activation logs wherein the authenticity of the log is not impaired as a result of radioactivity resulting from activation of the detector itself.

Still another object of this invention may be stated to be the production of a scintillation counter capable of delivering an output of energy, the substantial entirety of which is free of energy resulting from the decay of radioactive isotopes within the crystal itself, under conditions where a flux of slow neutrons arrive in the area of the detector.

Still other objects of the invention will be appreciated as the description of the invention proceeds.

According to this invention, the neutron-gamma ray log and the activation log as described herein above are carried out with instruments provided with means to capture such scattered neutrons as might be incident upon the detecting device, thereby permitting the detector to continue its instantaneous reaction with the formation gamma rays, and, alternatively, its reaction with the decay energy arising from the isotopes within the formation without the simultaneous reaction of neutron capture and isotope production within itself. Various means may be employed to intercept the scattered neutrons and prevent their reaching the crystal; however, several criteria must be taken into consideration in providing a suitable interceptor, as will appear hereinafter. A preferred means for intercepting the scattered neutrons is that afforded by providing a casing for the crystal, which casing is rich in a material having a high capture cross section for slow neutrons, for example, boron, especially boron-10; although the boron interceptor may be a boron compound containing the naturally occurring isotope distribution, it is preferable to employ a boron material containing a large proportion of boron-10 which is found to capture neutrons more readily than is the naturally occurring substance with the normal isotope distribution. Boron of natural isotopic abundance, containing a mixture of $B^{10}$ and $B^{11}$, has a cross section for thermal neutron capture of 750 barns. Boron-10, however, by itself, has a cross section of 3500 barns for thermal neutron capture. The reason for the desirability of using a material enriched in the $B^{10}$ isotope, therefore, is readily apparent.

Similarly, lithium compounds may be employed, especially materials enriched in the $Li^6$ isotope, which isotope has a slow neutron capture cross section of 950 barns.

As indicated above, other criteria than cross section for slow neutron capture are important for consideration in the problem. Thus, in addition to having a high neutron capture cross section, the selected interceptor material should not of itself become activated so as to introduce decay energy into the crystal, thereby producing a similar disturbance to that which is sought to be alleviated. Additionally, the interceptor material should not emit objectionable capture gamma rays, that is to say, capture gamma rays of an energy sufficiently high to overlap the energy levels of the gamma radiations which are desired to be detected from the formation, since such a condition would simply introduce other inaccuracies into the neutron-gamma ray log.

Both boron and lithium are especially suitable inasmuch as they fulfill all of the conditions, boron being preferred because of its higher cross section and its gamma ray emission characteristics, namely, low-energy gamma rays of the order of about 490 kev.; such gamma rays may be excluded from measurement by discrimination. Lithium does not emit gamma radiation under neutron bombardment. Both lithium and boron emit heavy charged particles upon neutron bombardment. These heavy particles must be excluded from the scintillation crystal, as by means disclosed below.

It is especially desirable to employ as the interceptor material compounds of elements such as boron or lithium. It is found that many compounds may be employed; however, once again, care must be exercised in the selection of compound so that the elements of the compound, in addition to boron or lithium, do not participate in objectionable neutron interactions such as in one way or another would interfere with objects of the invention. Suitable compounds are such as $B_4C$, $H_3BO_3$, $B_2O_3$, $LiOH$, $Li_2O$, $LiH$, $Li_2CO_3$, and still others. The use of either boron or lithium in compound form rather than in pure form, wherein either hydrogen or carbon is the other component of the compound provides an excellent interceptor for slow neutrons since either hydrogen or carbon would serve to slow down the neutrons incident upon the detector, thereby vastly increasing the probability of capture by the boron or lithium.

Also, an excellent moderator or interceptor for neutrons may be prepared by employing either boron or lithium materials, such as described above, surrounded by still other materials which are rich in hydrogen or carbon. Thus, for example, a boron carbide shield may be employed as the neutron capture material and the interstitial spaces of the boron carbide shield may be filled with a material rich in carbon and hydrogen, for example, normal hexane or paraffin, the hexane or paraffin acting as a neutron moderator. Similar effects are produced by many other hydrocarbons, and water. Advantageous effects are produced by incorporating the boron or lithium interceptor material along with a further moderator material into a resinous material which itself is rich in hydrogen and carbon. Preferably, high melting point resins should be employed in this embodiment of the invention in view of the fact that high temperatures are encountered within the bore hole; however, if a suitable thermal insulation is employed or cooling for the detector is available, this factor becomes no problem.

Appended hereto are drawings illustrative of the invention. FIG. 1 of the drawings is a schematic illustration of well surveying instrumentation with pertinent legends indicating the character of the several parts. FIG. 2 is a vertical cross-sectional view of a scintillation counter, coupled with a photomultiplier unit, with which, in use, it is associated.

In the drawings, numeral 10 refers to a casing or housing in which is contained much of the instrumentation of the logging apparatus. Numeral 12 denotes a deuterium-tritium intermittent or pulse-type neutron source, a fuller understanding of which, if needed, may be had by reference to United States patent to A. H. Youmans, No. 2,689,918. The neutron source is shielded in a manner customary in the art with lead and paraffin as at numerals 14 and 16, respectively, whereby to prevent direct interaction between the detector and the neutron flux from the source.

Numeral 18 denotes a crystal assembly of the scintillation type which crystal assembly is described more fully at a later point herein in connection with FIG. 2. Suitably associated with crystal assembly 18 is a photomultiplier unit denoted by numeral 24, the output of which is delivered by wiring 26 to an amplifier 28. Power is supplied to photomultiplier 24 through wiring 20 from power supply 22. Connected to amplifier 28 is a pulse shaper 30, numeral 32 denoting wiring by which the output of the amplifier is delivered thereto. Numeral 34 denotes a cable which serves to transport the entire assembly of housing 10 within the well bore and to provide the necessary electrical transmission facilities for the operation. Numeral 36 denotes a reel from which cable is payed out and taken in as the instrument is lowered and raised in the well bore.

As will be understood, the output pulses of pulse shaper 30 are delivered upwardly by way of cable 34 to a point above ground and thence to amplifier 38 by way of wiring 39 where the signal is further amplified. Numeral 40 denotes wiring by which the amplified pulses are delivered to a pulse height analyzer 42, which may include a counting rate meter.

Numeral 44 denotes circuitry which serves to count the output of the pulse height analyzer and to direct it to the appropriate recorder stylus actuating means, switching of the circuit being controlled by timing mechanism 46. Timing mechanism 46 serves to turn neutron source in the well on and off as desired by way of suitable wiring 47 connected through the reel to cable 34 and, within the well bore instrument, through wiring 48. As the source is turned on and off, the switching circuit is actuated coincidently through wiring 50, to direct the pulse height analyzer output appropriately to the recorder. Thus, during the on-time of the source, the switching circuit delivers the signal through wiring 52 to the mechanism of recorder 54 controlling stylus 56 which is recording the neutron-gamma ray log; and during the off-time of the source, the signal is delivered to the actuating mechanism of stylus 60, which is recording the activation log. These logs are correlated with depth in the well bore in any suitable fashion, as by means of cable contacting pulley-wheel 62 which is associated with the recorder by shafting 64, speed-changing gear box 66 and shafting 68. All of the foregoing described equipment is well known as is its manner of assembly and operation and it is unnecessary to continue discussion in this respect.

Referring now to FIG. 2 of the drawings, numeral 70 denotes a sodium iodide (thallium activated) scintillation crystal of a conventional type. Numeral 72 denotes a reflecting material and numeral 74 a container in which the crystal and reflector assembly are contained. Numeral 73 denotes a glass window which serves to seal the crystal within container 74 and prevent admission of moisture. Suitably, glass window 73 contains a high percentage of boron-10. Glass window 73 opens upon photomultiplier tube 24 which receives light energy from the crystal and converts it into electrical energy. Silicone oil or other suitable material is placed between glass window 73 and crystal 70 and between glass window 73 and photomultiplier 24 as indicated by numerals 75 and 77, respectively. This detector construction is conventional in the art.

Numeral 76 denotes neutron interceptor material which surrounds the entire assembly and overlaps the photomultiplier tube, as shown in this embodiment of the inventive apparatus. Neutron interceptor 76 in this embodiment is composed of an admixture of boron-10 carbide with an hydrogenous resin.

If desired, still further moderating material, as indicated above, may be supplied around the neutron interceptor 76. In practice, the moderator may be as thick as is desired and practical, generally about 2 centimeters being sufficient to intercept neutrons of quite high energy and prevent their reaching the interior of the assembly and activating the crystal itself.

With the crystal assembly as illustrated in FIG. 2 in place with the well surveying instrument as the crystal 18 thereof, neutron-gamma ray logging and activation logging are carried out in the conventional and well-known manner. In so doing, according to this invention, the disadvantage of effects of neutron interaction within the crystal, as described herein, are overcome.

As above mentioned, the capture of neutrons by boron or lithium produces heavy charged particles of high energy detectable by a scintillation crystal. Happily, these may easily be removed by a thin shield. The walls of container 74 suffice. If glass window 73 contains boron or lithium, the optical coupling 75 may be made thick enough to stop the heavy charged particles. The 490 kev. gamma rays from boron are not so easily shielded. No amount of shielding will eliminate all such gamma rays, and any amount will also attenuate the gamma rays it is desired to detect. However, the 490 kev. gamma rays can be excluded from measurement electronically. It is a characteristic of scintillation counters that their output electrical voltage pulses are substantially proportional to the energy of respective input gamma rays. By electronic means it is possible to exclude from measurement all electrical pulses of voltage (or so-called pulse height) corresponding to 490 kev. gamma rays and those of lesser energy. This is a function performed by pulse height analyzer 42, which in its simplest form is a conventional integral discriminator adjusted to exclude electrical pulses of height less than that corresponding to the boron gamma rays.

Although the shielded detector has been described for use in simultaneous neutron-gamma and activation logging, it is equally applicable to any logging in which a detector made of material appreciably activated by slow neutrons is used to detect other radiation in the presence of slow neutrons or shortly after the presence of slow neutrons in the vicinity of the detector. Further, it is not necessary that the shield 76 be immediately outside the crystal container. It may in fact be outside the housing 10. Other modifications and variations may be made within the scope of this invention, which is limited only as indicated in the following claims.

I claim:

1. A method of measuring radiation to the substantial exclusion of the effects of slow neutrons with a pulse-type detector which produces output electrical pulses of height related to the energy of gamma rays incident thereon, and which detector is at times in a region containing a flux of slow neutrons and is formed of material made appreciably radioactive when exposed to such a flux of slow neutrons, said method comprising the steps of capturing said slow neutrons with a boron shield prior to their entry into said detector, excluding from said detector the charged particles produced upon such capture, electrically selecting pulses from said detector which correspond to gamma rays of energy greater than boron gamma rays, and utilizing the selected pulses as a measurement of incident radiation other than slow neutrons.

2. A radioactivity well logging system comprising a scintillation counter having a crystal for radiation detection in a region exposed to a flux of slow neutrons, an interceptor of slow neutrons disposed about said crystal, said interceptor containing a substantial amount of an element selected from the group consisting of boron and lithium, means disposed between said interceptor and said crystal for stopping alpha particles produced upon the capture of slow neutrons by boron, and electrical means suppressing such electrical signals from said scintillation counter as are occasioned by gamma rays of energy no greater than that of gamma rays from said element.

3. In apparatus for radioactivity well logging in which gamma radiation following neutron irradiation of the formations is measured with a pulse type gamma ray sensitive detector which produces output electrical pulses of height related to the energy of gamma rays incident thereon and which is formed of material which becomes appreciably radioactive when exposed to slow neutrons, the improvement which comprises an interceptor of slow neutrons disposed about said detector, said interceptor containing a substantial amount of boron, an alpha particle shield disposed between said interceptor and said detector, and electrical means for suppressing detection signals produced by said detector upon detection of gamma rays of energy no greater than the 490 kev. gamma rays from boron.

References Cited in the file of this patent

UNITED STATES PATENTS

| | | |
|---|---|---|
| Re. 24,383 | McKay | Oct. 29, 1957 |
| 2,303,688 | Fearon | Dec. 1, 1942 |
| 2,463,733 | Albaugh | Mar. 8, 1949 |
| 2,782,318 | Herzog | Feb. 19, 1957 |
| 2,785,314 | Grahame | Mar. 12, 1957 |
| 2,862,106 | Scherbatskoy | Nov. 25, 1958 |
| 2,888,568 | Jones | May 26, 1959 |

FOREIGN PATENTS

| | | |
|---|---|---|
| 724,441 | Great Britain | Feb. 23, 1955 |